(12) United States Patent
Tomoda et al.

(10) Patent No.: US 8,614,861 B1
(45) Date of Patent: Dec. 24, 2013

(54) MAGNETIC RECORDING HEAD INCLUDING A HIGH-FREQUENCY OSCILLATOR AND DISK DRIVE WITH THE SAME

(71) Applicant: Kabushiki Kaisha Toshiba, Tokyo (JP)

(72) Inventors: Yusuke Tomoda, Zama (JP); Kenichiro Yamada, Tokyo (JP); Naoyuki Narita, Fuchu (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 13/712,027

(22) Filed: Dec. 12, 2012

(30) Foreign Application Priority Data

Jun. 29, 2012 (JP) ................................. 2012-147764

(51) Int. Cl.
*G11B 5/127* (2006.01)
*G11B 5/187* (2006.01)

(52) U.S. Cl.
USPC ....................................... 360/125.3; 360/110

(58) Field of Classification Search
USPC .......................... 360/110, 125.3, 125.71, 128
See application file for complete search history.

(56) References Cited

U.S. PATENT DOCUMENTS

| | | | |
|---|---|---|---|
| 7,791,829 B2 | 9/2010 | Takeo et al. | |
| 7,957,098 B2 | 6/2011 | Yamada et al. | |
| 8,081,397 B2 | 12/2011 | Funayama et al. | |
| 8,238,060 B2 | 8/2012 | Yamada et al. | |
| 8,295,009 B2 | 10/2012 | Yamada et al. | |
| 2009/0052095 A1 | 2/2009 | Yamada et al. | |
| 2009/0059417 A1 | 3/2009 | Takeo et al. | |
| 2009/0316304 A1 | 12/2009 | Funayama et al. | |
| 2010/0220415 A1 | 9/2010 | Yamada et al. | |
| 2011/0205655 A1* | 8/2011 | Shimizu et al. ................. | 360/39 |
| 2011/0216436 A1* | 9/2011 | Igarashi et al. ................. | 360/61 |
| 2011/0299192 A1 | 12/2011 | Yamada et al. | |
| 2011/0300409 A1 | 12/2011 | Yamada et al. | |
| 2012/0113543 A1* | 5/2012 | Shiimoto et al. ................ | 360/75 |
| 2012/0268844 A1 | 10/2012 | Yamada et al. | |

FOREIGN PATENT DOCUMENTS

| | | |
|---|---|---|
| JP | 2009-064499 A | 3/2009 |
| JP | 2009-070541 A | 4/2009 |
| JP | 2010-003353 A | 1/2010 |
| JP | 2010-225230 A | 10/2010 |
| WO | WO 2010/053187 A1 | 5/2010 |

* cited by examiner

*Primary Examiner* — Jefferson Evans
(74) *Attorney, Agent, or Firm* — Knobbe, Martens, Olson & Bear, LLP (57) ABSTRACT

According to one embodiment, a magnetic recording head includes a main pole configured to apply a recording magnetic field to a recording layer of a recording medium, and a high-frequency oscillator disposed adjacent to the main pole and near a air-bearing surface which faces the recording medium. The high-frequency oscillator includes a lower end surface located nearest to the air-bearing surface and an upper end surface located farthest from the air-bearing surface. A length of the lower end surface in a cross track direction is longer than a length of the upper end surface in the cross track direction.

12 Claims, 10 Drawing Sheets

MAGNETIC RECORDING HEAD INCLUDING A HIGH-FREQUENCY OSCILLATOR AND DISK DRIVE WITH THE SAME

CROSS-REFERENCE TO RELATED APPLICATIONS

This application is based upon and claims the benefit of priority from Japanese Patent Application No. 2012-147764, filed Jun. 29, 2012, the entire contents of which are incorporated herein by reference.

FIELD

Embodiments described herein relate generally to a magnetic recording head for perpendicular magnetic recording used in a disk drive and the disk drive provided with the same.

BACKGROUND

A disk drive, such as a magnetic disk drive, comprises a magnetic disk, spindle motor, magnetic head, and carriage assembly. The magnetic disk is disposed in a case. The spindle motor supports and rotates the magnetic disk. The magnetic head reads data from and writes data to the magnetic disk. The carriage assembly supports the magnetic head for movement relative to the magnetic disk. A head section of the magnetic head comprises a recording head for writing and a reproduction head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, trailing shield, and coil. The trailing shield is located on the trailing side of the main pole with a write gap therebetween. The coil serves to pass magnetic flux through the main pole.

To improve the recording density, a high-frequency magnetic field assisted recording head is proposed, in which a spin-torque oscillator for use as a high-frequency oscillator is disposed between the main pole and trailing shield such that a high-frequency magnetic field from the oscillator is applied to a magnetic recording layer. Drive current is supplied to the high-frequency oscillator, and magnetization of a generating layer is generated with sufficient amplitude. In this way, a large high-frequency magnetic field can be produced such that a stable recording/reproduction characteristic can be achieved.

To achieve a higher recording density and more stable recording/reproduction characteristic, it is necessary to apply the high-frequency magnetic field to a smaller region and obtain a greater high-frequency magnetic field intensity. A higher drive current is required for this purpose. If the drive current is increased, however, the high-frequency oscillator is gradually degraded, so that it may become difficult to achieve a stable recording/reproduction characteristic, in some cases.

DETAILED DESCRIPTION

Various embodiments will be described hereinafter with reference to the accompanying drawings. In general, according to one embodiment, a magnetic recording head comprises: a main pole configured to apply a recording magnetic field to a recording layer of a recording medium; and a high-frequency oscillator disposed adjacent to the main pole and near a air-bearing surface which faces the recording medium. The high-frequency oscillator comprises a lower end surface located nearest to the air-bearing surface and an upper end surface located farthest from the air-bearing surface, a length of the lower end surface in a cross track direction being longer than a length of the upper end surface in the cross track direction.

First Embodiment

Figure 1:
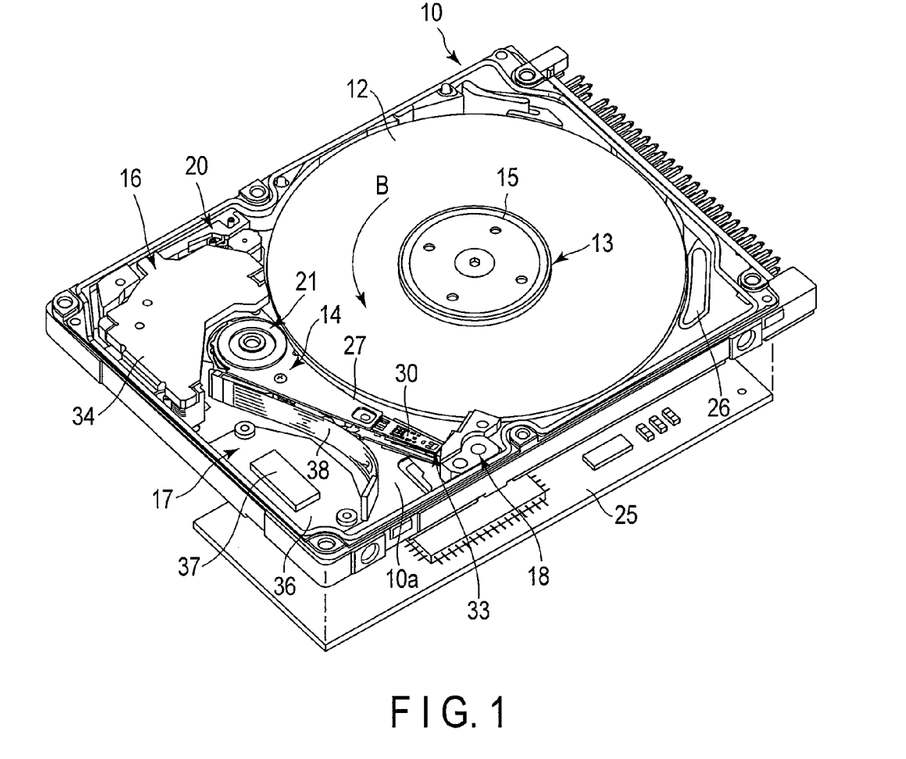
FIG. 1 is a perspective view showing a magnetic disk drive (HDD) according to a first embodiment.
Figure 2:
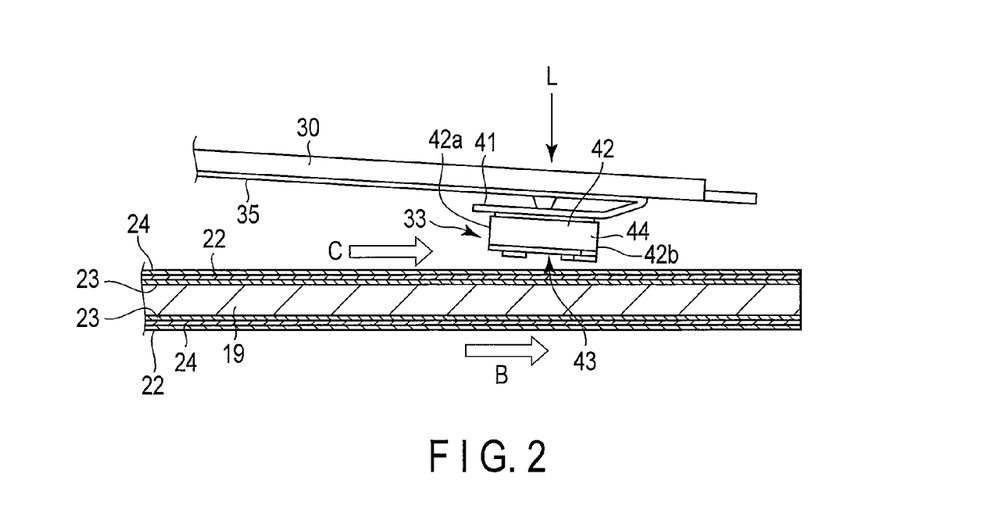
FIG. 2 is a side view showing a magnetic head and suspension of the HDD.

FIG. 1 shows the internal structure of a hard disk drive (HDD) as a disk drive according to a first embodiment with its top cover removed, and FIG. 2 shows a flying magnetic head. As shown in FIG. 1, the HDD comprises a housing 10. The housing 10 comprises a base 12 in the form of an open-topped rectangular box and the top cover (not shown) in the form of a rectangular plate. The top cover is attached to the base by screws so as to close the top opening of the base. Thus, the housing 10 is kept airtight inside and can communicate with the outside through a breathing filter 26 only.

The base 11 carries thereon a magnetic disk 12, for use as a recording medium, and a drive unit. The drive unit comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record and reproduce data in and from the disk. The head actuator 14 supports the heads 33 for movement relative to the surface of the disk 12. The VCM 16 pivots and positions the head actuator. The base 11 further carries a ramp loading mechanism 18, inertial latch 20, and board unit 17. The ramp loading mechanism 18 holds the magnetic heads 33 in positions off the magnetic disk 12 when the heads are moved to the outermost periphery of the disk. The inertial latch 20 holds the head actuator 14 in a retracted position if the HDD is jolted, for example. Electronic components, such as a preamplifier, head IC, etc., are mounted on the board unit 17.

A printed circuit board 25 is attached to the outer surface of the base 11 by screws so as to face the bottom wall of the base. The circuit board 25 controls the operations of the spindle motor 13, VCM 16, and magnetic heads 33 through the board unit 17.

As shown in FIGS. 1 and 2, the magnetic disk 12 is constructed as a perpendicular magnetic recording film medium. The disk 12 comprises a substrate 19 formed of a nonmagnetic disk with a diameter of, for example, about 2.5 inches. A soft magnetic layer 23 for use as an underlayer is formed on each surface of the substrate 19. The soft magnetic layer 23 is overlain by a perpendicular magnetic recording layer 22, which has a magnetic anisotropy perpendicular to the disk surface. Further, a protective film 24 is formed on the recording layer 22.

As shown in FIG. 1, the magnetic disk 12 is coaxially fitted on the hub of the spindle motor 13 and clamped and secured to the hub by a clamp spring 21, which is attached to the upper end of the hub by screws. The disk 12 is rotated at a predetermined speed in the direction of arrow B by the spindle motor 13.

As shown in FIGS. 1 and 2, the head actuator 14 comprises a bearing 15 secured to the bottom wall of the base 11 and a plurality of arms 27 extending from the bearing. The arms 27 are arranged parallel to the surfaces of the magnetic disk 12 and at predetermined intervals and extend in the same direction from the bearing 15. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each magnetic head 33 is supported on an extended end of its corresponding suspension 30 by a gimbal spring 41. Each suspension 30, gimbal spring 41, and magnetic head 33 constitute a head gimbal assembly. The head actuator 14 may comprise a so-called E-block in which a sleeve of the bearing 15 and a plurality of arms are formed integrally with one another.

As shown in FIG. 2, each magnetic head 33 comprises a substantially cuboid slider 42 and read/write head section 44 on an outflow end (trailing end) of the slider. A head load L directed to the surface of the magnetic disk 12 is applied to each head 33 by the elasticity of the suspension 30. The two arms 27 are arranged parallel to and spaced apart from each other, and the suspensions 30 and heads 33 mounted on these arms face one another with the magnetic disk 12 between them.

Each magnetic head 33 is electrically connected to a main flexible printed circuit board (main FPC, described later) 38 through the suspension 30 and a relay FPC 35 on the arm 27. As shown in FIG. 1, the board unit 17 comprises an FPC main body 36 formed of a flexible printed circuit board and the main FPC 38 extending from the FPC main body. The FPC main body 36 is secured to the bottom surface of the base 11. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 15 in the direction opposite to the arms 27 and a voice coil supported on the support frame. When the head actuator 14 is assembled to the base 11, the voice coil is located between a pair of yokes 34 that are secured to the base 11. Thus, the voice coil, along with the yokes and a magnet secured to one of the yokes, constitutes the VCM 16.

If the voice coil of the VCM 16 is energized with the magnetic disk 12 rotating, the head actuator 14 pivots, whereupon each magnetic head 33 is moved to and positioned on a desired track of the magnetic disk 12. As this is done, the head 33 is moved radially relative to the disk 12 between the inner and outer peripheral edges of the disk.

Figure 3:
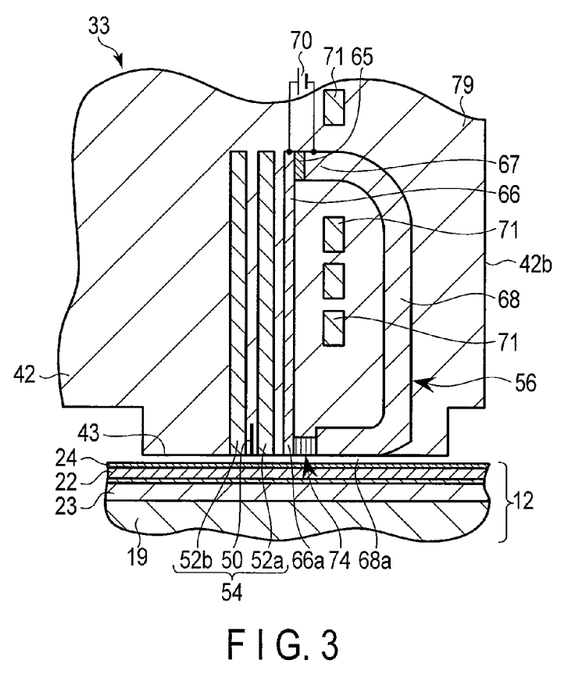
FIG. 3 is an enlarged sectional view showing a head section of the magnetic head.
Figure 4:
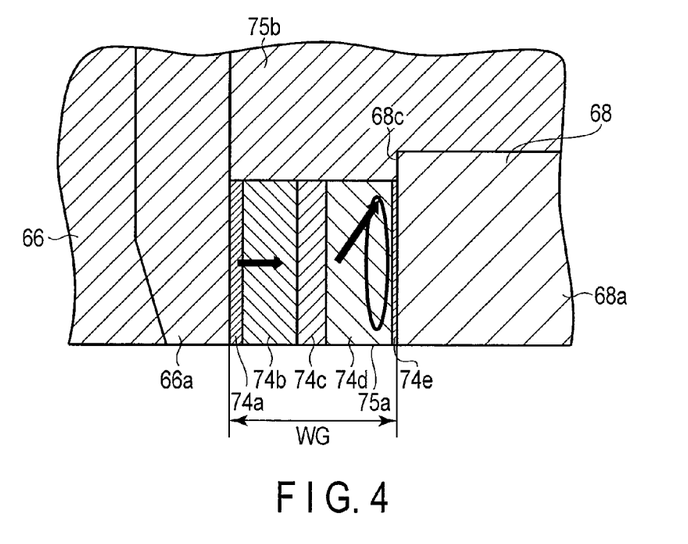
FIG. 4 is an enlarged sectional view showing the distal end portion of a magnetic recording head.

The following is a detailed description of a configuration of each magnetic head 33. FIG. 3 is an enlarged sectional view showing the head section 44 of the head 33. FIG. 4 is an enlarged sectional view showing a disk-side end portion of the magnetic recording head.

As shown in FIGS. 2 and 3, each magnetic head 33 is constructed as a flying head, which comprises the substantially cuboid slider 42 and head section 44 formed on the outflow or trailing end of the slider. The slider 42 is formed of, for example, a sintered body (AlTic) containing alumina and titanium carbide, and the head section 44 is a thin film.

The slider 42 has a rectangular air-bearing surface or air-bearing surface (ABS) 43 configured to face a surface of the magnetic disk 12. The slider 42 is kept floating a predetermined distance from the disk surface by airflow C that is produced between the disk surface and ABS 43 as the disk 12 rotates. The direction of airflow C is coincident with the direction of rotation B of the disk 12. The slider 42 is located on the surface of the disk 12 in such a manner that the longitudinal direction of the ABS 43 is substantially coincident with the direction of airflow C.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIG. 3, the head section 44 is formed as a dual-element magnetic head, comprising a reproduction head 54 and magnetic recording head 56 formed on the trailing end 42b of the slider 42 by thin-film processing.

The reproduction head 54 comprises a magnetic film 50 having a magnetoresistive effect and shielding films 52a and 52b disposed on the trailing and leading sides, respectively, of the magnetic film such that they sandwich the magnetic film between them. The respective lower ends of the magnetic film 50 and shielding films 52a and 52b are exposed in the ABS 43 of the slider 42.

The magnetic recording head 56 is located nearer to the trailing end 42b of the slider 42 than the reproduction head 54. As shown in FIGS. 3 and 4, the recording head 56 comprises a main pole 66 of a high-saturation-magnetization material, trailing shield (or shield pole) 68, recording coil 71, and spin-torque oscillator 74 as a high-frequency oscillator. The main pole 66 produces a recording magnetic field perpendicular to the surfaces of the magnetic disk 12. The trailing shield 68 is opposed to the trailing side of the main pole 66 with a gap therebetween and serves to efficiently close a magnetic path through the soft magnetic layer 23 just below the main pole. The recording coil 71 is located so that it is wound around a magnetic circuit (magnetic core) including the main pole 66 and trailing shield 68 to pass magnetic flux to the main pole while a signal is being written to the disk 12. The spin-torque oscillator 74 is a laminated body comprising magnetic and nonmagnetic conductors, disposed between a distal end portion 66a of the main pole 66 on the side of the ABS 43 and the trailing shield 68 and in a region facing the ABS 43.

The main pole 66 extends substantially perpendicular to the surfaces of the magnetic disk 12. The distal end portion 66a of the main pole 66 on the disk side is tapered toward the disk surface. The distal end portion 66a of the main pole 66 has, for example, a rectangular cross-section, and the distal end surface of the main pole is exposed in the ABS 43 of the slider 42. In the present embodiment, the width of the distal end portion 66a of the main pole 66 is substantially equal to the track width of the magnetic disk 12.

The trailing shield 68 is substantially U-shaped and its distal end portion 68a has an elongated rectangular shape. The distal end surface of the trailing shield 68 is exposed in the ABS 43 of the slider 42. A leading end surface 68c of the distal end portion 68a extends in a cross track direction of the magnetic disk 12. This leading end surface 68c is opposed substantially parallel to the trailing end surface of the main pole 66 with write gap WG therebetween. Side shields may be arranged individually on the opposite sides of the main pole 66 in the track-width direction. The side shields enable reduction of fringe magnetic fields for adjacent tracks, thereby improving the recording density in a cross track direction.

The trailing shield 68 is connected to the main pole 66 through a back gap portion 67 formed of a non-conductor, such as $SiO_2$, in a position separated from the ABS 43. This non-conductor electrically insulates the main pole 66 and trailing shield 68 from each other.

A power supply 70 is connected to the main pole 66 and trailing shield 68, and a current circuit is constructed such that current from the power supply can be supplied in series through the main pole 66, spin-torque oscillator 74, and trailing shield 68.

Figure 5:
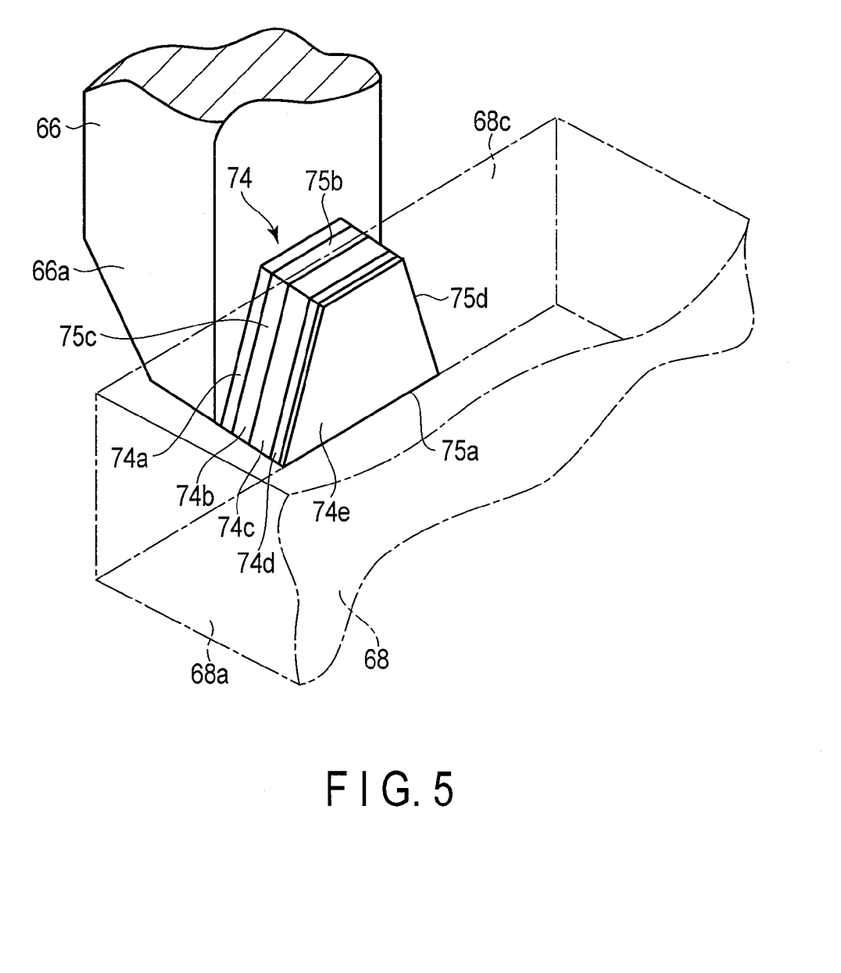
FIG. 5 is an enlarged perspective view showing a high-frequency oscillator and the distal end portion of a main pole of the magnetic recording head.
Figure 6:
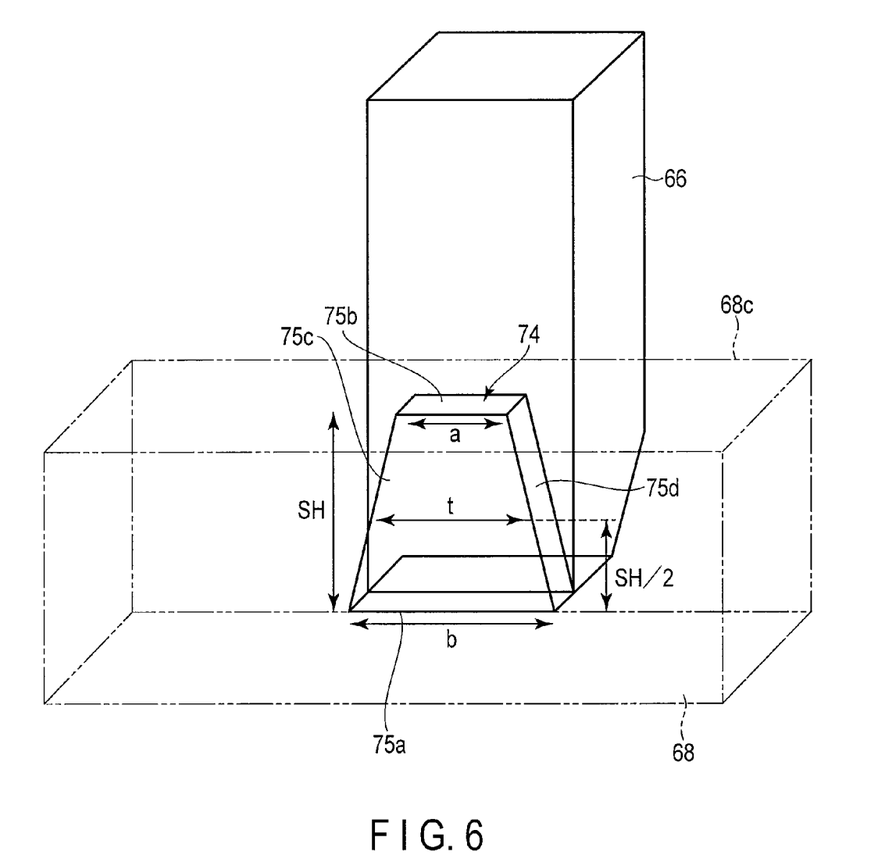
FIG. 6 is an enlarged perspective view schematically showing the high-frequency oscillator and the distal end portion of the main pole of the magnetic recording head.

FIGS. 5 and 6 are perspective views schematically showing the main pole and spin-torque oscillator. As shown in FIGS. 4 to 6, the spin-torque oscillator 74 is interposed between the distal end portion 66a of the main pole 66 and the leading end surface 68c of the trailing shield 68. The oscillator 74 is formed by sequentially laminating an underlayer 74a, spin injection layer (first magnetic layer) 74b, interlayer 74c, generating layer (second magnetic layer) 74d, and cap layer 74e, from the side of the main pole 66 to the side of the trailing shield 68. The underlayer 74a and cap layer 74e are nonmagnetic conductive layers. The generating layer 74d is a soft magnetic film of an FeCoNi alloy with a saturation flux density as high as 2 T. The interlayer 74c is a copper film having a long spin-diffusion length. Further, the spin injection layer 74b is an artificial-lattice film of Co/Ni having high coercive force and high spin polarization ratio. Although the spin injection layer 74b, interlayer 74c, and generating layer 74d are stacked in the order named, the generating layer, interlayer, and spin injection layer may alternatively be stacked in this order.

A material with high spin transmittance, such as gold, silver, etc., may be used for the interlayer 74c. Preferably, the interlayer 74c should be one-atom-layer thick at the minimum and 3 nm thick at the maximum. Thus, exchange coupling between the spin injection layer 74b and generating layer 74d can be adjusted to an optimum value.

Further, the spin injection layer 74b may suitably be a CoCr-based magnetic layer, such as CoCrPt, CoCrTa, CoCrTaPt, CoCrTaNb, etc., RE-TM-based amorphous-alloy magnetic layer, such as TbFeCo, artificial-lattice magnetic layer, such as Co/Pd, Co/Pt, CoCrTa/Pd, FeCo/Pt, FeCo/Ni, etc., CoPt- or FePt-alloy magnetic layer, material with high vertical orientation, such as an SmCo-alloy magnetic material, soft magnetic layer with a relatively high saturation flux density and in-plane magnetic anisotropy, such as CoFe, CoNiFe, NiFe, CoZrNb, FeN, FeSi, FeAlSi, etc., Heusler alloy selected from a group including CoFeSi, CoMnSi, CoMnAl, etc., or CoCr-based magnetic alloy film with magnetization oriented in the in-plane direction. Further, a laminate of some of these materials may be used for the spin injection layer 74b.

Furthermore, iron, cobalt, or nickel, an alloy or artificial lattice combining these materials, or a laminate of various materials that can be used for the spin injection layer 74b may be used for the generating layer 74d. The generating layer 74d may be formed of a material prepared by doping an FeCo alloy with at least one of elements including aluminum, silicon, germanium, gallium, manganese, chromium, and boron. Thus, for example, the saturation flux densities of the generating layer 74d and spin injection layer 74b, anisotropic magnetic field, and spin-torque transmission efficiency can be adjusted.

Preferably, the thickness of the generating layer 74d should be adjusted to 5 to 20 nm, and that of the spin injection layer 74b to 2 to 60 nm.

The spin-torque oscillator 74 has its lower end surface 75a exposed in the ABS 43 of the slider 42 and located at substantially the same height as the distal end surface of the main pole 66 with respect to the surface of the magnetic disk 12. Specifically, the lower end surface 75a of the oscillator 74 is located flush with the ABS 43 of the slider 42 and substantially parallel to the surfaces of the magnetic disk 12. Further, the spin-torque oscillator 74 comprises an upper end surface 75b and opposite side surfaces 75c and 75d. The upper end surface 75b is located farthest from the ABS 43 and extends substantially parallel to the lower end surface 75a. The side surfaces 75c and 75d extend from the lower end surface to the upper end surface. At least one of the side surfaces or both the side surfaces 75c and 75d as illustrated are inclined inward or toward the center of the tracks with respect to the direction perpendicular to the ABS 43. Length a of the upper end surface 75b in a cross track direction or core is shorter than length b of the lower end surface 75a in a cross track direction (a<b). Thus, that surface of the spin-torque oscillator 74 which faces the main pole 66 has a trapezoidal shape transversely symmetrical with respect to the tracks. Length b of the lower end surface 75a in a cross track direction is substantially equal to the length (or width) of the main pole 66 in a cross track direction.

Under the control of the control circuit board 25, the spin-torque oscillator 74 is supplied with direct current along its film thickness as voltage from the power supply 70 is applied to the main pole 66 and trailing shield 68. By this current supply, the magnetization of the generating layer 74d of the oscillator 74 can be rotated to produce a high-frequency magnetic field. In this way, the oscillator 74 applies the high-frequency magnetic field to the recording layer of the magnetic disk 12. Thus, the trailing shield 68 and main pole 66 serve as electrodes for perpendicular energization of the oscillator 74.

Example 1

As shown in FIG. 6, the spin-torque oscillator 74 was formed into a trapezoidal shape transversely symmetrical with respect to the tracks, and length b of the lower side (lower end surface 75a) in a cross track direction was made longer than length a of the upper side (upper end surface 75b) in a cross track direction. Further, the difference (b−a) between lengths a and b was adjusted to 10 nm, and element height SH, that is, the distance between the lower and upper end surface 75a and 75b, to 50 nm. Then, the high-frequency magnetic field density (high-frequency field strength/half-width of high-frequency magnetic field) obtained from the spin-torque oscillator 74 when width (length in a cross track direction) t of the oscillator in a position (SH/2=25 nm) corresponding to the half of element height SH was changed was determined.

Figure 7:
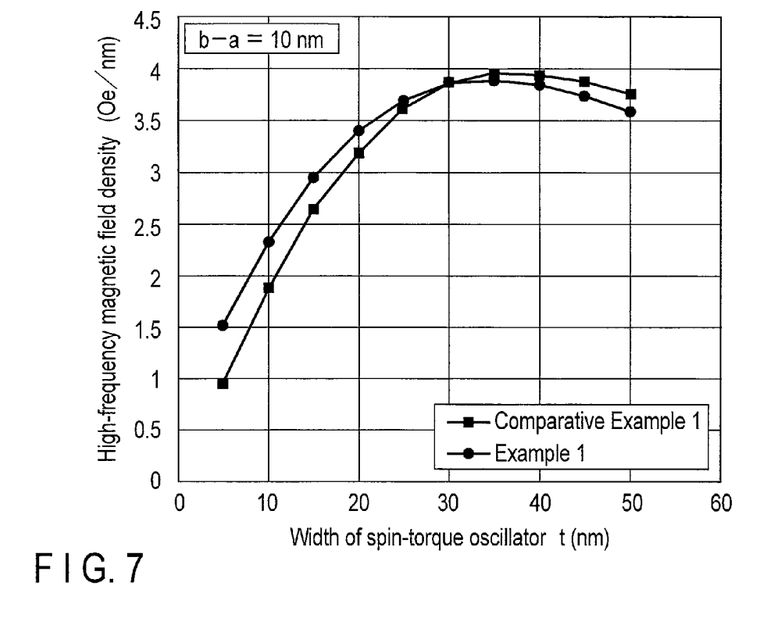
FIG. 7 is a diagram comparatively showing high-frequency magnetic field densities (per unit length transversely relative to tracks or in a cross track direction) obtained from a spin-torque oscillator according to Example 1 and a spin-torque oscillator according to Comparative Example 1.

FIG. 7 comparatively shows the results of measurements on high-frequency magnetic field densities (per unit length in a cross track direction) obtained from the trapezoidal spin-torque oscillator according to Example 1 and a square (or rectangular) spin-torque oscillator with an element height of 50 nm according to Comparative Example 1. As seen from FIG. 7, the high-frequency magnetic field density obtained from the trapezoidal spin-torque oscillator of Example 1 is higher than that from the spin-torque oscillator of Comparative Example 1 in a region where oscillator width t is 30 nm or less.

Example 2

In Example 2, the spin-torque oscillator 74 shown in FIG. 6 was formed into a trapezoidal shape transversely symmetrical with respect to the tracks, length b of the lower side (lower end surface 75a) in a cross track direction was made longer than length a of the upper side (upper end surface 75b) in a cross track direction, and the difference (b−a) between lengths a and b was adjusted to 20 nm. Then, the high-frequency magnetic field density obtained from the spin-torque oscillator 74 when width (length in a cross track direction) t of the oscillator in the position (SH/2) corresponding to the half of element height SH was changed was determined.

Figure 8:
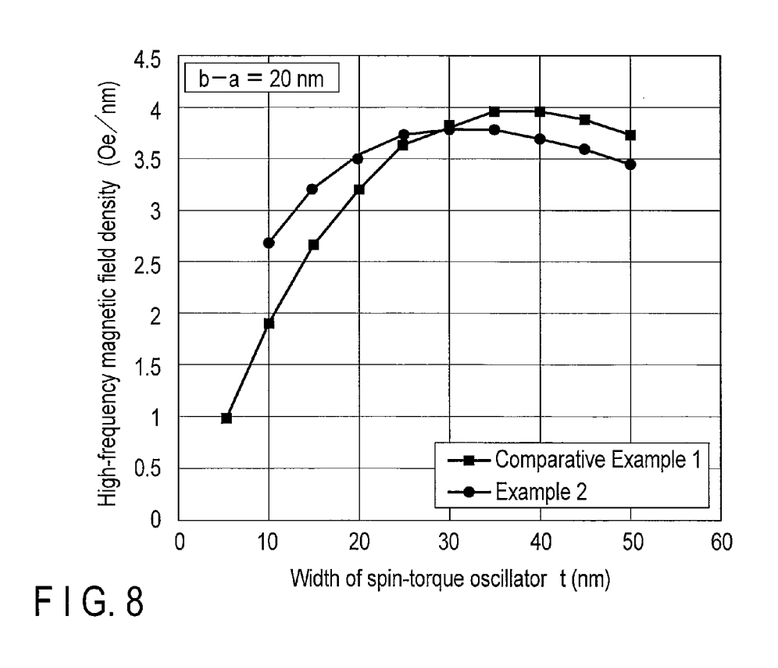
FIG. 8 is a diagram comparatively showing high-frequency magnetic field densities (per unit length transversely relative to tracks) obtained from a spin-torque oscillator according to Example 2 and the spin-torque oscillator according to Comparative Example 1.

FIG. 8 comparatively shows the results of measurements on high-frequency magnetic field densities (per unit length in a cross track direction) obtained from the trapezoidal spin-torque oscillator according to Example 2 and the square (or rectangular) spin-torque oscillator according to Comparative Example 1. As seen from FIG. 8, the high-frequency magnetic field density obtained from the trapezoidal spin-torque oscillator of Example 2 is higher than that from the spin-torque oscillator of Comparative Example 1 in a region where oscillator width t is 30 nm or less.

Example 3

In Example 3, the spin-torque oscillator was formed into a trapezoidal shape transversely symmetrical with respect to the tracks, length b of the lower side in a cross track direction was made longer than length a of the upper side in a cross track direction, and the difference (b−a) between lengths a and b was adjusted to 30 nm. Then, the high-frequency magnetic field density obtained from the spin-torque oscillator 74 when width (length in a cross track direction) t of the oscillator in the position (SH/2) corresponding to the half of element height SH was changed was determined.

Figure 9:
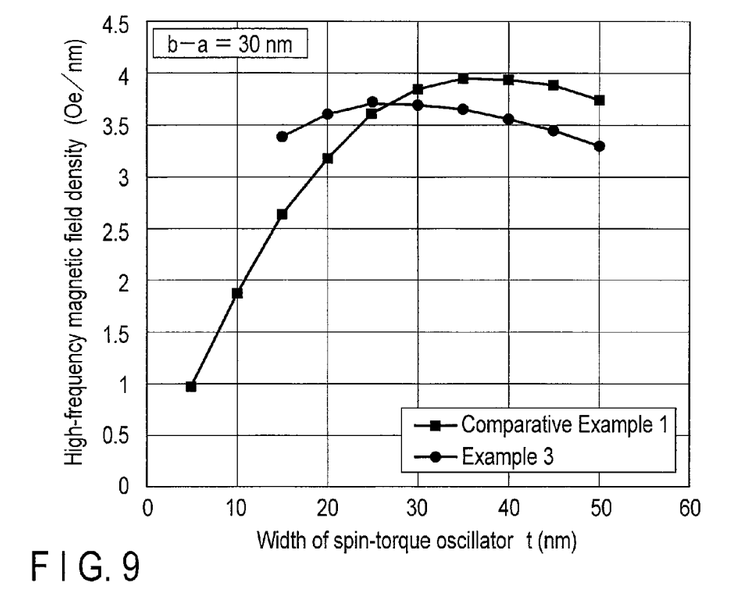
FIG. 9 is a diagram comparatively showing high-frequency magnetic field densities (per unit length transversely relative to tracks) obtained from a spin-torque oscillator according to Example 3 and the spin-torque oscillator according to Comparative Example 1.

FIG. 9 comparatively shows the results of measurements on high-frequency magnetic field densities (per unit length in a cross track direction) obtained from the trapezoidal spin-torque oscillator according to Example 3 and the square (or rectangular) spin-torque oscillator according to Comparative Example 1. As seen from FIG. 9, the high-frequency magnetic field density obtained from the trapezoidal spin-torque oscillator of Example 3 is higher than that from the spin-torque oscillator of Comparative Example 1 in a region where oscillator width t is 26 nm or less.

Example 4

Figure 10:
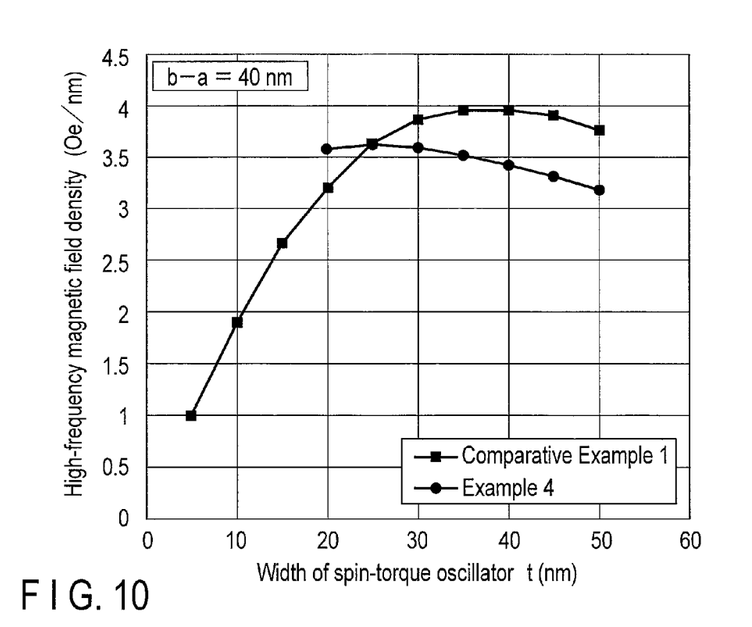
FIG. 10 is a diagram comparatively showing high-frequency magnetic field densities (per unit length transversely relative to tracks) obtained from a spin-torque oscillator according to Example 4 and the spin-torque oscillator according to Comparative Example 1.

In Example 4, the spin-torque oscillator was formed into a trapezoidal shape transversely symmetrical with respect to the tracks, length b of the lower side was made longer than length a of the upper side, and the difference (b−a) between lengths a and b was adjusted to 40 nm. Then, the high-frequency magnetic field density obtained from the spin-torque oscillator when width t of the oscillator was changed was determined. As seen from FIG. 10, the high-frequency magnetic field density obtained from the trapezoidal spin-torque oscillator 74 of Example 4 is higher than that from the square (or rectangular) spin-torque oscillator of Comparative Example 1 in a region where oscillator width t is 25 nm or less.

Example 5

Figure 11:
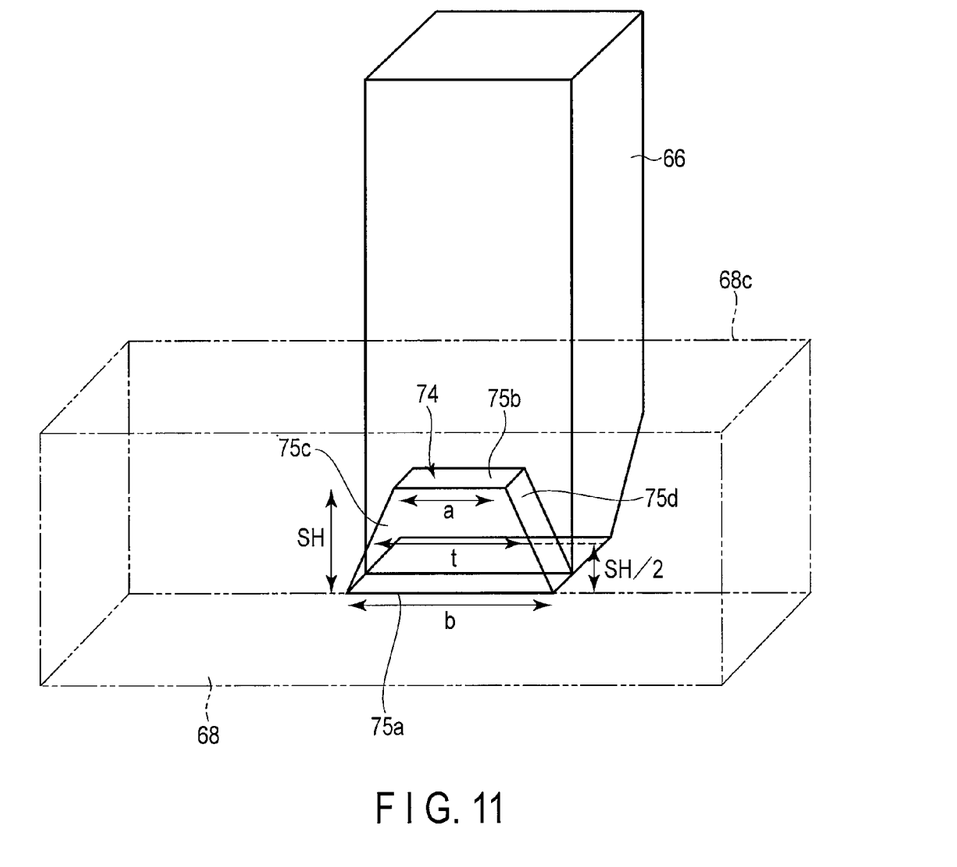
FIG. 11 is a perspective view schematically showing the main pole and one of the spin-torque oscillators according to Examples 5 to 8.

As shown in FIG. 11, the spin-torque oscillator 74 was formed into a trapezoidal shape transversely symmetrical with respect to the tracks, length b of the lower side (lower end surface 75a) in a cross track direction was made longer than length a of the upper side (upper end surface 75b) in a cross track direction, and the difference (b−a) between lengths a and b was adjusted to 10 nm. Then, the high-frequency magnetic field density (high-frequency field strength/half-width of high-frequency magnetic field) obtained from the spin-torque oscillator 74 when width t of the oscillator in a position (SH/2=12.5 nm) corresponding to the half of element height SH was changed was determined.

Figure 12:
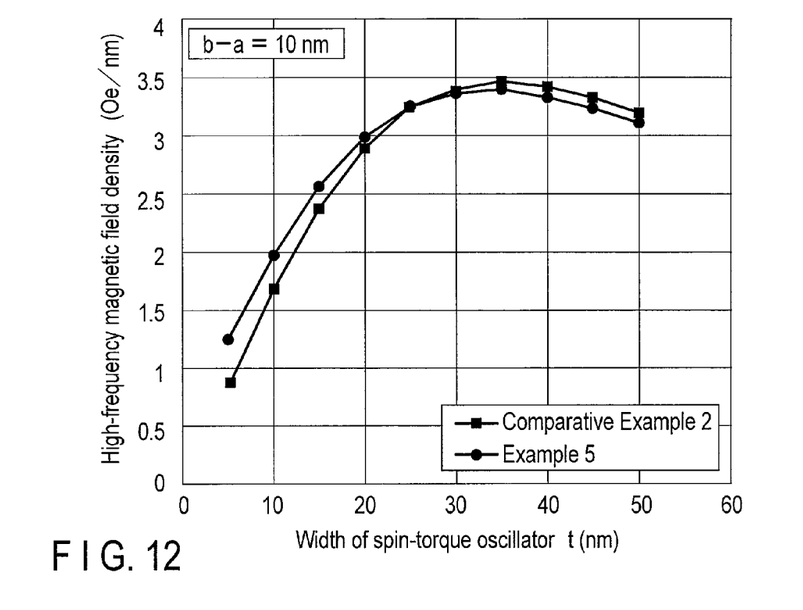
FIG. 12 is a diagram comparatively showing high-frequency magnetic field densities (per unit length transversely relative to tracks) obtained from the spin-torque oscillator according to Example 5 and a spin-torque oscillator according to Comparative Example 2.

FIG. 12 comparatively shows the results of measurements on high-frequency magnetic field densities (per unit length in a cross track direction) obtained from the trapezoidal spin-torque oscillator according to Example 5 and a square (or rectangular) spin-torque oscillator with an element height of 25 nm according to Comparative Example 2. As seen from FIG. 12, the high-frequency magnetic field density obtained from the trapezoidal spin-torque oscillator of Example 5 is higher than that from the spin-torque oscillator of Comparative Example 2 in a region where oscillator width t is 30 nm or less.

Example 6

Figure 13:
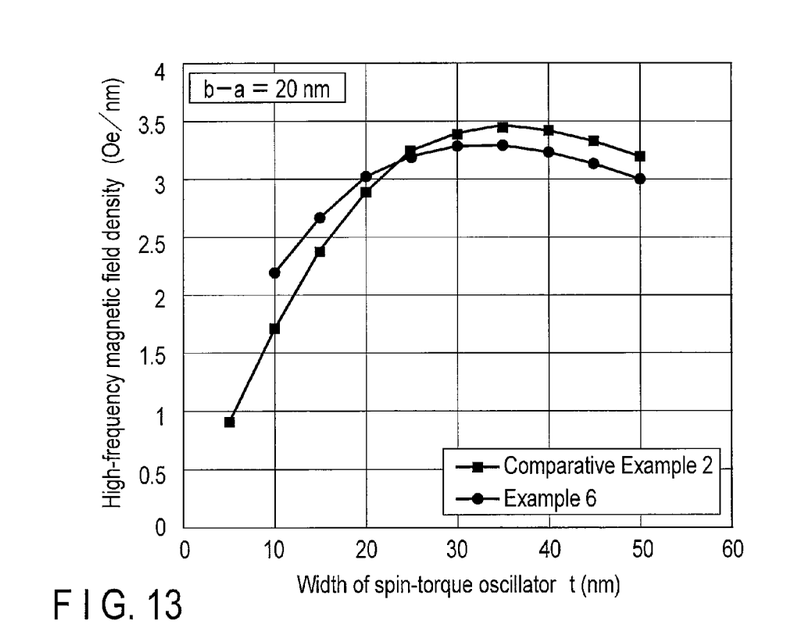
FIG. 13 is a diagram comparatively showing high-frequency magnetic field densities (per unit length transversely relative to tracks) obtained from the spin-torque oscillator according to Example 6 and the spin-torque oscillator according to Comparative Example 2.

In Example 6, the spin-torque oscillator 74 shown in FIG. 11 was formed into a trapezoidal shape transversely symmetrical with respect to the tracks, length b of the lower side was made longer than length a of the upper side, and the difference (b−a) between lengths a and b was adjusted to 20 nm. Then, the high-frequency magnetic field density obtained from the spin-torque oscillator 74 when width t of the oscillator in the position (SH/2) corresponding to the half of element height SH was changed was determined. Thereupon, as seen from FIG. 13, the high-frequency magnetic field density obtained from the trapezoidal spin-torque oscillator of Example 6 is higher than that from the spin-torque oscillator of Comparative Example 2 in a region where oscillator width t is 25 nm or less.

Example 7

In Example 7, the spin-torque oscillator 74 shown in FIG. 11 was formed into a trapezoidal shape transversely symmetrical with respect to the tracks, length b of the lower side was made longer than length a of the upper side, and the difference (b−a) between lengths a and b was adjusted to 30 nm. Then, the high-frequency magnetic field density obtained from the spin-torque oscillator 74 when width t of the oscillator in the position (SH/2) corresponding to the half of element height SH was changed was determined.

Figure 14:
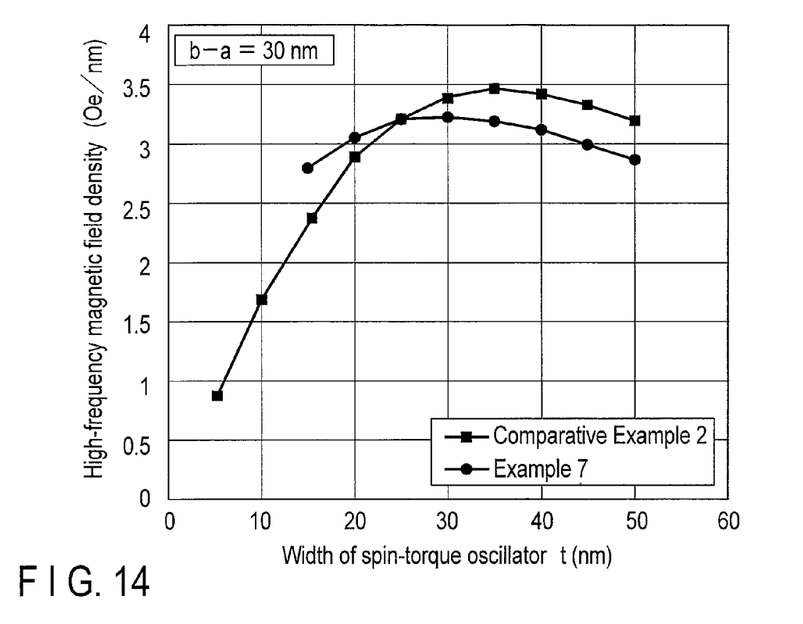
FIG. 14 is a diagram comparatively showing high-frequency magnetic field densities (per unit length transversely relative to tracks) obtained from the spin-torque oscillator according to Example 7 and the spin-torque oscillator according to Comparative Example 2.

FIG. 14 shows the results of measurements and indicates that the high-frequency magnetic field density obtained from the spin-torque oscillator of Example 7 is higher than that from the spin-torque oscillator of Comparative Example 2 in a region where oscillator width t is 25 nm or less.

Example 8

Figure 15:
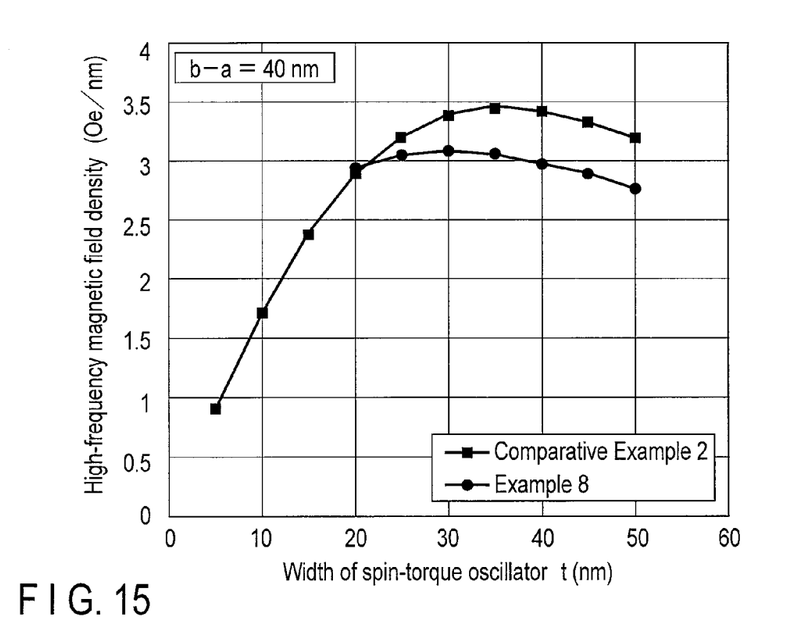
FIG. 15 is a diagram comparatively showing high-frequency magnetic field densities (per unit length transversely relative to tracks) obtained from the spin-torque oscillator according to Example 8 and the spin-torque oscillator according to Comparative Example 2.

In Example 8, the spin-torque oscillator 74 shown in FIG. 11 was formed into a trapezoidal shape transversely symmetrical with respect to the tracks, length b of the lower side was made longer than length a of the upper side, and the difference (b−a) between lengths a and b was adjusted to 40 nm. Then, the high-frequency magnetic field density obtained from the spin-torque oscillator when width t of the oscillator was changed was determined. As seen from FIG. 15, the high-frequency magnetic field density obtained from the trapezoidal spin-torque oscillator 74 of Example 8 is higher than that from the square (or rectangular) spin-torque oscillator of Comparative Example 2 in a region where oscillator width t is 20 nm or less.

According to the HDD and magnetic recording head of the first embodiment constructed in this manner, the length of the lower end surface of the spin-torque oscillator in a cross track direction is made longer than the length of the upper end surface, and the spin-torque oscillator is made substantially trapezoidal. In this way, the high-frequency magnetic field density of the spin-torque oscillator can be increased so that the high-frequency magnetic field can be applied to a smaller region on the recording medium. Thus, there can be provided a magnetic recording head, capable of reduction in drive current and improvement in high-frequency magnetic field density, and hence, of higher-density magnetic recording, and a disk drive provided with the same.

The following is a description of magnetic heads of HDDs according to alternative embodiments. In the description of these alternative embodiments to follow, like reference numbers are used to designate the same parts as those of the first embodiment, and a detailed description thereof is omitted. The following is a detailed description focused on different parts.

Second Embodiment

Figure 16:
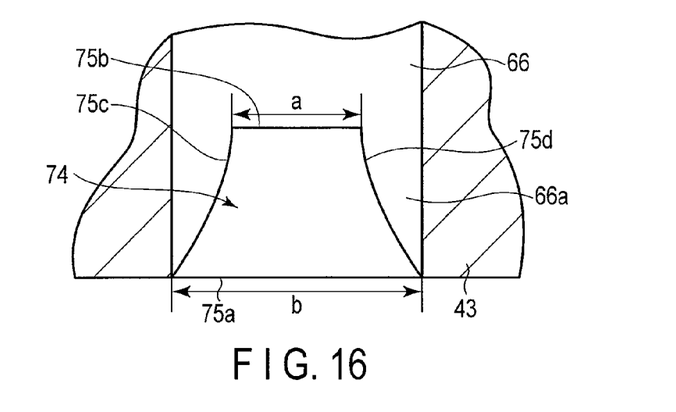
FIG. 16 is a front view showing a spin-torque oscillator and main pole of a magnetic recording head of an HDD according to a second embodiment.

FIG. 16 is a front view showing a magnetic recording head of a magnetic head of an HDD according to a second embodiment. In the first embodiment described above, the spin-torque oscillator is formed into a trapezoidal shape transversely symmetrical with respect to the tracks. However, it may be of another shape, provided that length b of the lower end surface 75a in a cross track direction is longer than length a of the upper end surface 75b in a cross track direction. According to the second embodiment, a spin-torque oscillator 74 comprises a lower end surface 75a flush with an ABS 43, upper end surface 75b separated from the ABS and extending substantially parallel to the lower end surface, and opposite side surfaces 75c and 75d extending between the lower and upper end surfaces. Length b of the lower end surface 75a in a cross track direction is longer than length a of the upper end surface 75b in a cross track direction, and the side surfaces 75c and 75d are concave.

Third Embodiment

Figure 17:
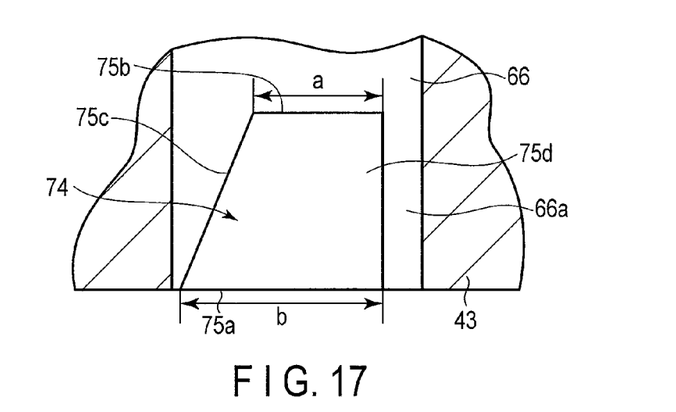
FIG. 17 is a front view showing a spin-torque oscillator and main pole of a magnetic recording head of an HDD according to a third embodiment.

FIG. 17 is a front view showing a magnetic recording head of a magnetic head of an HDD according to a third embodiment. According to the third embodiment, a spin-torque oscillator 74 comprises a lower end surface 75a flush with an ABS 43, upper end surface 75b separated from the ABS and extending substantially parallel to the lower end surface, and opposite side surfaces 75c and 75d extending between the lower and upper end surfaces. Length b of the lower end surface 75a in a cross track direction is longer than length a of the upper end surface 75b in a cross track direction. The one side surface 75c is inclined inward or toward the center of the tracks with respect to the direction perpendicular to the ABS 43, while the other side surface 75d extends substantially perpendicular to the ABS 43. The side surfaces 75c and 75d may be replaced with each other.

Fourth Embodiment

Figure 18:
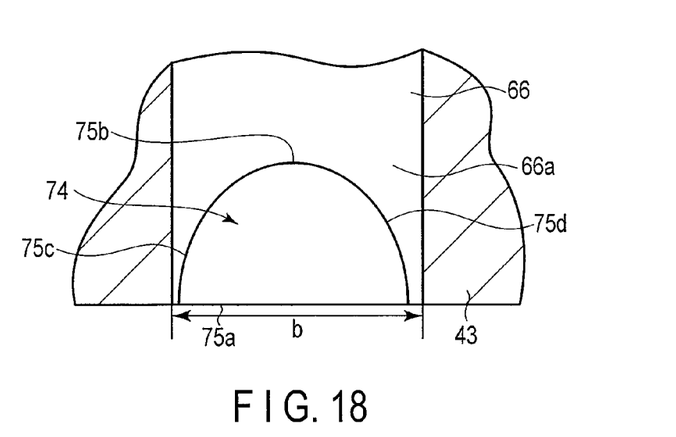
FIG. 18 is a front view showing a spin-torque oscillator and main pole of a magnetic recording head of an HDD according to a fourth embodiment.

FIG. 18 is a front view showing a magnetic recording head of a magnetic head of an HDD according to a fourth embodiment. According to the fourth embodiment, a spin-torque oscillator 74 comprises a lower end surface 75a flush with an ABS 43, upper end surface 75b located farthest from the ABS, and opposite side surfaces 75c and 75d extending between the lower and upper end surfaces. Length b of the lower end surface 75a in a cross track direction is longer than length a of the upper end surface 75b in a cross track direction, and the upper end surface 75b and side surfaces 75c and 75d are convex.

The second to fourth embodiments arranged in this manner can provide the same effects as those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the high-frequency oscillator may be disposed on the leading side of the main pole as well as on the trailing side.

What is claimed is:

1. A magnetic recording head comprising:
   a main pole configured to apply a recording magnetic field to a recording layer of a recording medium; and
   a high-frequency oscillator disposed adjacent to the main pole and near an air-bearing surface which faces the recording medium,
   the high-frequency oscillator comprising a lower end surface located nearest to the air-bearing surface and an upper end surface located farthest from the air-bearing surface, a length of the lower end surface in a cross track direction being longer than a length of the upper end surface in the cross track direction.

2. The magnetic recording head of claim 1, wherein the high-frequency oscillator comprises opposite side surfaces extending from the lower end surface to the upper end surface, at least one of the side surfaces being inclined relative to a direction perpendicular to the air-bearing surface.

3. The magnetic recording head of claim 2, wherein the high-frequency oscillator is trapezoidal.

4. The magnetic recording head of claim 2, wherein the side surfaces are curved surfaces.

5. The magnetic recording head of claim 4, further comprising a shield pole opposed to the main pole with a gap therebetween, wherein the high-frequency oscillator is located between the main pole and the shield pole.

6. The magnetic recording head of claim 1, further comprising a shield pole opposed to the main pole with a gap therebetween, wherein the high-frequency oscillator is located between the main pole and the shield pole.

7. The magnetic recording head of claim 2, further comprising a shield pole opposed to the main pole with a gap therebetween, wherein the high-frequency oscillator is located between the main pole and the shield pole.

8. A disk drive comprising:
   a disk recording medium comprising a recording layer;
   a drive unit configured to support and rotate the recording medium; and
   the magnetic recording head of claim 1 configured to perform data processing on the recording medium.

9. The disk drive of claim 8, wherein the high-frequency oscillator comprises opposite side surfaces extending from the lower end surface to the upper end surface, at least one of the side surfaces being inclined relative to a direction perpendicular to the air-bearing surface.

10. The disk drive of claim 9, wherein the high-frequency oscillator is trapezoidal.

11. The disk drive of claim 10, wherein the side surfaces are curved surfaces.

12. The disk drive of claim 11, further comprising a shield pole opposed to the main pole with a gap therebetween, wherein the high-frequency oscillator is located between the main pole and the shield pole.

* * * * *